S. Arnold,
Fly Trap,
Nº 15,464.    Patented Aug. 5, 1856.
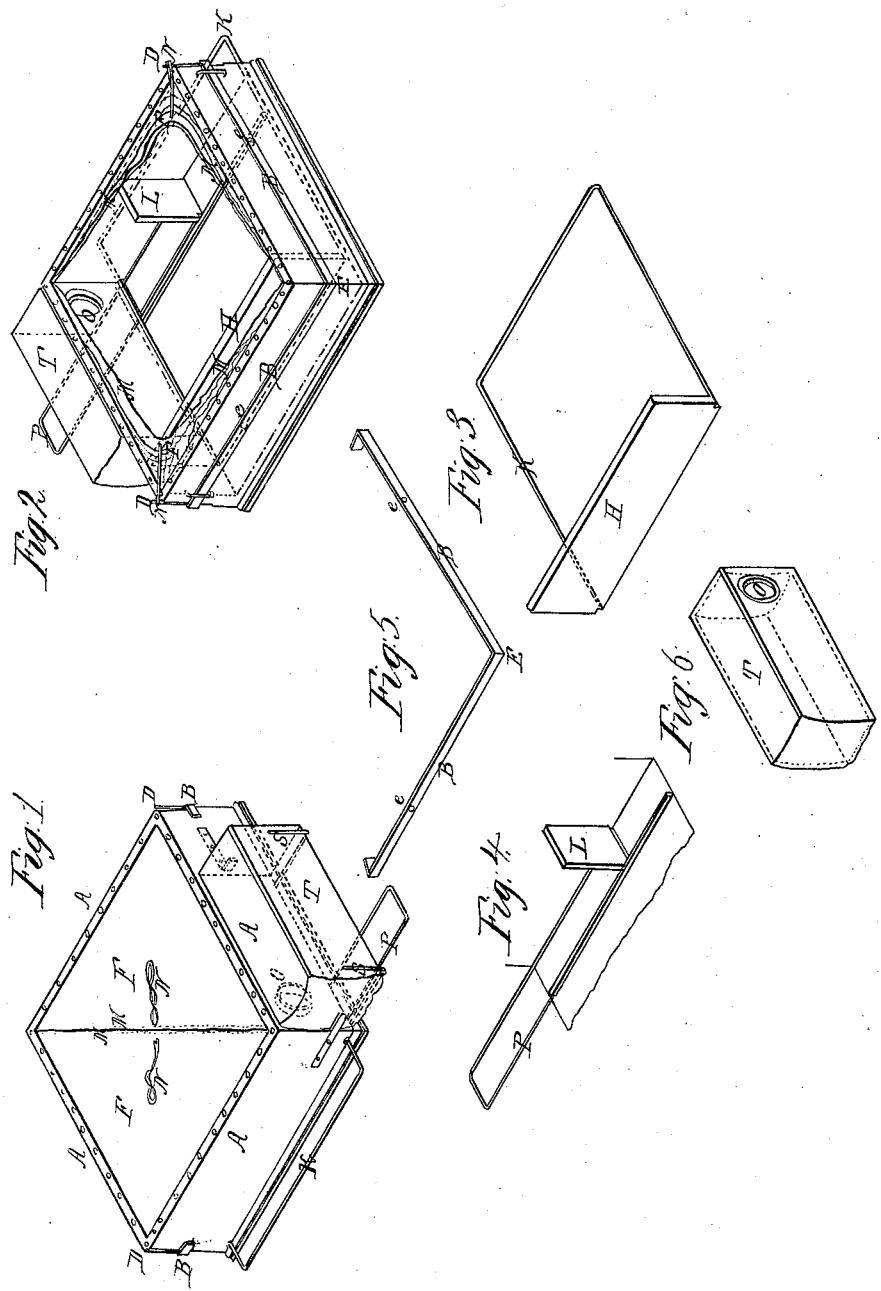

UNITED STATES PATENT OFFICE.

SAML. ARNOLD, OF WILSON COUNTY, TENNESSEE.

FLY-TRAP.

Specification of Letters Patent No. 15,464, dated August 5, 1856.

*To all whom it may concern:*

Be it known that I, SAMUEL ARNOLD, of Wilson county, in the State of Tennessee, have invented a new and useful Machine for Catching House-Flies, which I call a "Fly-Catcher;" and I do hereby declare that the following is a full, clear, and exact description of the construction and operation of the same, reference being had to the annexed drawings, making a part of this specification, in which—

Figure 1 represents a perspective view of the fly catcher; Fig. 2 a perspective view, taken from the opposite side as that of Fig. 1, the covering cloth being partly removed or drawn back and set for catching flies, and whereby, the inside arrangements are exposed to view. Fig. 3, is a perspective view of a large slide; Fig. 4 a perspective view of a small slide; Fig. 5, a perspective view of a lever or metallic bands; and Fig. 6, a perspective view of a glass receiver; the said Figs. 3, 4, 5 and 6 representing detached perspective views of details, the letters of reference marked thereon, corresponding to the letters of reference in Figs. 1 and 2.

Fig. 1 A A A A are sides of box; B B, lever; e e, as seen in Fig. 2, are fulcrums of lever; D D, triggers, being points of lever, which are elevated above the top of the box, or depressed below it, by upward or downward pressure of lever, with the fingers at E; F F, two sections of cloth cover, tacked to the top of the box; M M, two gum elastic cords, extending diagonally across the box parallel and in close proximity to each other, fastened to opposite corners of the box, and sewed to each section of cloth cover; N N, two loops, one fastened to each cord, which being drawn and hitched over the triggers D D, opens or sets the catches as represented by said Fig. 2. Sugar or other bait, sprinkled on the bottom of the box, will collect the flies. The upward pressure of the lever at E, will depress the triggers D D below the top of the box, loops N N will slip off; the elasticity of the gum elastic cords will close the cloth top of the box over the flies; H, large slide, extending across the box, and from bottom to top; K, wire handle attached to each end of large slide, for the purpose of drawing it and forcing the flies to a space within about two inches of the opposite side of the box; L, small slide, two inches wide and extending from the top to the bottom of the box; P, handle of small slide to draw it and move the flies to and through the orifice O, into the glass receiver T, where they are submerged in soapsuds. S S stay on which the receiver T rests, as seen in Fig. 1.

The nature of my invention as above shown consists in a simple and expeditious mode of catching and removing house flies.

To enable others to make and use my invention I will proceed to describe its construction and operation.

The box is made of wood and the receiver of glass, and may be in any of the known forms of such vessels, and the other parts are adjusted and fitted thereto. A square box is preferable, the sides the depth of three inches; the glass receiver about seven inches long, and sides square 2½ by 3 inches. The box should be shallow because flies will the more readily and without fear, congregate on the bottom to eat the sugar or other bait thereon placed. It can be made of any material or style, according to taste, even to the highly ornamental. The receiver may also be made ornamental. The lever may be made of any metal. The slides are made by attaching pieces of wood, the length and width adapted to the space they occupy, to wire bent so as to fit the box and places when they work, and the wire projecting a little out of the box forms handles, by which they may be drawn out or pushed in as necessary or desired.

What I claim as my invention, and desire to secure by Letters Patent is—

The mechanical arrangement of box, jar, springs, lever, slides and covering above described, for the purposes set forth.

S. ARNOLD.

Witnesses:
T. M. PATTERSON,
F. G. PATTERSON.